April 6, 1965 J. A. FELTS 3,177,495

SPRING MOUNTED HEAD FOR DISC MEMORY

Filed May 31, 1962

INVENTOR.
JOHN A. FELTS

BY Geo. Seevers

ATTORNEY

United States Patent Office 3,177,495
Patented Apr. 6, 1965

3,177,495

SPRING MOUNTED HEAD FOR DISC MEMORY

John A. Felts, Los Angeles, Calif., assignor to General Precision, Inc., a corporation of Delaware Filed May 31, 1962, Ser. No. 198,894
3 Claims. (Cl. 346—74)

This invention relates to electromagnetic recording, and more particularly to a novel and improved mounting for recording heads that are used with magnetic memory discs or drums.

Virtually all digital computers require a memory device which is used to store information that is being introduced into the computer, or information that is already computed and is to be held until such time as it is needed for further computation. Most memories are of the electromagnetic recording type and may take the form of tapes, drums, or discs upon which is coated a magnetic film that will retain coded information pulses that are "printed" thereon by an electromagnetic recording head.

When the information represented by these pulses is required by the computer, a reading head is activated to read the code that was deposited by the recording head. In this specification the term "recording head" is intended to mean either a reading or a recording head, since the novel mounting described herein is equally usable with both types.

In order for a recording head to impress a clear and adequate signal on the recording medium, and to produce an adequate signal voltage when reading from the recording medium, it is necessary that the head be in physical contact or in very close proximity to the recording medium. This is easily accomplished when magnetic tapes are used, since the tape, which is very flexible, may be brought in physical contact to the stationary head. However, if memory drums are used, the problem is more difficult since the drum is a rigid and non-flexible rotating element. If it is desired to have the recording head in very close proximity, but not in physical contact with the recording surface of the drum, it is essential that extreme caution be taken to assure that the surface of the drum is perfectly concentric. If any eccentricity develops the stationary recording head may be spaced too far from the recording medium at one part of a revolution and may make physical contact with the recording medium at another point, thus damaging the drum surface.

The difficulty of properly positioning a recording head to the surface of a magnetic memory disc is similar to that of memory drums. Furthermore, a disc may be perfectly machined and recording heads may be perfectly adjusted so that they are in very close proximity to the recording surface, but a serious misalignment may occur from a slight shock or vibration that will cause the rotating shaft of the memory disc to be very slightly bent, resulting in a wobble of the surface of the disc, especially the surface nearer the periphery. If the recording heads are spring-mounted so that the heads make physical contact with the surface of the disc, no serious results may occur from this wobble effect; however, spring-mounted heads are generally undesirable because the heads, forced to make physical contact with the recording medium, cause a rapid wearing of the recording medium, thus shortening the usable life of the recording disc. Heretofore, stationary recording heads have been the most satisfactory from the standpoint of usable life of the recording disc, since, with this type of head, it is possible to position the recording head in very close proximity to the recording surface of the disc without making actual physical contact. If, however, a shock or vibration causes a misalignment of the disc, the recording heads, being stationary, cut into and destroy the recording surfaces of the disc.

The invention disclosed and described herein is usable with both magnetic memory drums and discs. The magnetic recording heads are spring-mounted, but are arranged so that they remain in very close proximity to the recording medium without ever making physical contact with the medium, regardless of any moderate wobble of a rotating magnetic memory disc or eccentricity of a rotating magnetic memory drum.

Briefly described, the recording head is mounted in a flat rectangular shoe which is held in a fixed position against the surface of the moving magnetic recording member by a leaf spring which permits free movement of the head and shoe in all directions, except in a lateral direction along the recording track of the magnetic recording member, and around the vertical axis of rotation of the shoe. While the leaf spring exerts a force which tends to force the shoe against the surface of the recording member, the shoe is actually maintained in very close proximity, and not in physical contact with the recording surface by a film of air flowing along the surface of the moving member. With a proper shoe configuration and a proper positioning of the leaf spring on the shoe, a constant air space of 0.00005 inch may be attained between the recording head and the magnetic surface of the moving member, irrespective of moderate amounts of wobble or eccentricity.

One object, therefore, is to provide a mounting for a recording head for a magnetic recording member that will permit free movement of the head in all directions, except in a lateral direction, along the recording track of the member, and around the vertical axis of rotation of the head.

Another object of this invention is to provide a mounting for a magnetic recording head that will maintain the head in very close proximity to the recording medium on the surface of the moving magnetic recording member, irrespective of wobble or eccentricity of the member.

Still another object of this invention is to provide a mounting for a recording head that will prevent the recording head from making physical contact with the surface of a moving magnetic recording member, irrespective of wobble or eccentricity of the member.

Additional objects and advantages of the invention will become apparent from a consideration of the following specification and claims, taken together with the accompanying drawings, in which:

Figures 1, 2, 3:
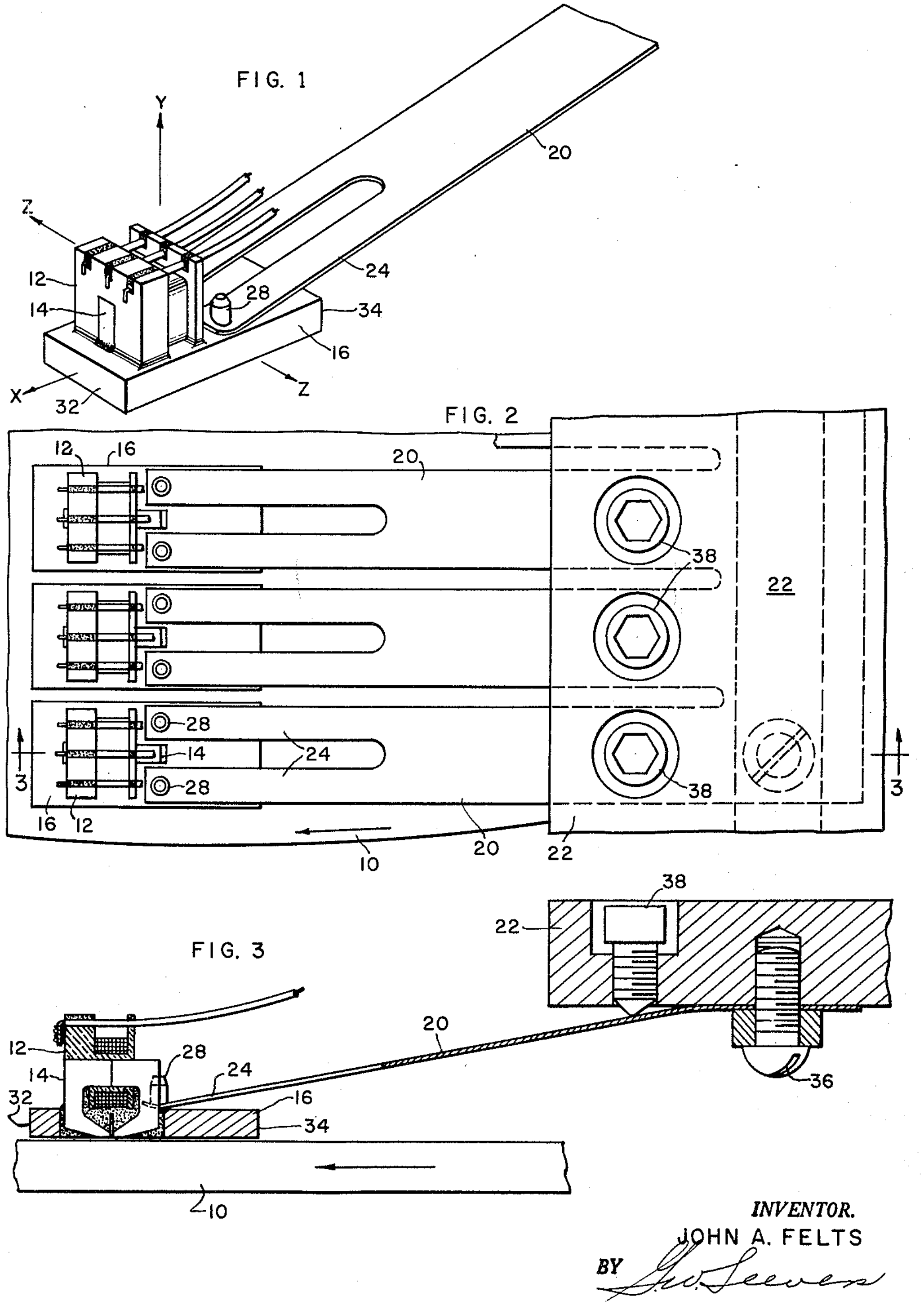
FIGURE 1 is a perspective view showing a recording head supported in mountings embodying this invention.
FIGURE 2 is a plan view showing a group of recording heads supported in mountings embodying this invention.
FIGURE 3 is an elevation view taken along line 3—3 of FIGURE 2, illustrating a preferred means of supporting and adjusting the head mounting embodying this invention against the surface of a magnetic recording disc.

Turning now to a detailed description of the invention, which is shown and described in use with a magnetic memory disc, but which is also adaptable for use with a memory drum, FIGURE 2 is a plan view showing a section of a magnetic memory disc 10, the top surface of which is coated with a thin film of magnetic material. Recording heads 12 are mounted so that their cores 14 are positioned in very close proximity to the recording surface of disc 10. If the recording head cores 14 are permitted to remain in physical contact with the magnetic material coated on disc 10 while rotating, the cores will score the magnetic material on disc 10, thus shortening the usable life or completely destroying the magnetic properties of the disc.

In order to maintain the recording head cores 14 in very close proximity to the surface of magnetic memory disc 10, and to assure that physical contact with the magnetic material on the surface of disc 10 is not made while the disc is rotating, the recording heads 12 are mounted in shoes 16 which are so designed and supported that memory disc 10, while rotating, will force a thin film of air between the lower surface of shoes 16 and the magnetic material on the surface of memory disc 10.

It is essential that recording heads that read and write on the surface of a memory disc be maintained on exactly the same radius, or distance, from the center of the disc, so that the heads will read and write, in the same track at all times. In computer applications, it is also necessary that a recording head be maintained at exactly the same angular position along the recording track of the memory disc. Because of the possibility of wobble developing in the disc, it is also important that the recording head be permitted movement in the vertical direction, along the Y axis, as shown in FIGURE 1; it must be freely permitted moderate amounts of dipping, i.e., rotation about its transverse axis of rotation, Z of FIGURE 1; moderate amounts of side tilt must be freely permitted, i.e., rotation about the longitudinal axis of rotation, X of FIGURE 1. It is also important that a recording head is prevented from yawing out of the line that is tangent to the recording disc track, i.e., rotation about the vertical axis of rotation, Y of FIGURE 1. Referring to the X, Y and Z axes, as shown in FIGURE 1, the desired movements and restrictions may be briefly summarized as follows: Recording head 12 and shoe 16 should be prevented from movement along the Z axis, along the X axis, and around the Y axis of rotation; movement should be permitted along the Y axis, around the Z axis, and around the X axis of rotation.

In order to provide recording head 12 that is mounted in shoe 16 with a suspension that will permit movement in certain directions and prevent movement in other directions, as noted above, shoe 16 is secured by a bifurcated leaf spring 20, which has one end securely attached to the stationary housing or other stationary member 22 that is positioned close to the surface of the magnetic memory disc 10. Bifurcated leaf spring 20 has two tines, 24, near the end of which are holes of sufficient diameter to loosely fit around alignment pins 28, which are vertically mounted in the top surface of shoes 16. It is desirable that the ends of tines 24 of bifurcated leaf spring 20 be slightly bent so that the point at which tines 24 contact shoe 16 coincides with the position of alignment pins 28.

The elevation view of FIGURE 3 shows a simple and effective method for mounting and adjusting bifurcated leaf spring 20. The shank end of bifurcated leaf spring 20 may be attached to a stationary member 22 by a screw 36, as shown in FIGURE 3. An adjustment screw 38 may also be mounted in a stationary member 22 and adjusted to exert that force on bifurcated leaf spring 20 that is required to properly position shoe 16 on the surface of memory disc 10.

The position of alignment pins 28, i.e., the support point on shoe 16 by bifurcated leaf spring 20, is important. The laminar flow of air flowing with the surface of disc 10 causes a leading edge 34 of shoe 16 to raise to form between the bottom surface of shoe 16 and the surface of disc 10 a pneumodynamic wedge which may be defined as a wedge of moving air that is formed between the surface of disc 10 and the bottom surface of shoe 16 which exerts a lifting force against the bottom surface of shoe 16 that is dependent upon the velocity of the air, the thickness of the air film, the dimensions of the bottom surface of shoe 16, and the friction that the bottom surface of shoe 16 presents to the moving air. It can be shown that a shoe that is .5 inch long and .2 inch wide which is positioned on a rotating disc at a point which is travelling at an approximate rate of 50 feet per second, may have a lifting force exerted by the pneumodynamic wedge as great as 65 grams. This lifting force is, of course, dependent upon the angle of attack generating the pneumodynamic wedge, and the angle of attack is dependent upon the location of the points at which the bifurcated leaf spring 20 supports shoe 16.

There are three principal forces that are continually acting against the lifting force of the pneumodynamic wedge. A static head that is caused by atmospheric pressure acts to force shoe 16 down toward the surface of disc 10; the combination of weights of shoe 16 and its associated recording head 12 adds the static head; and a velocity head caused by the high velocity air passing between the bottom surface of shoe 16 and the surface of disc 10 creates a low pressure which tends to aid in acting against the lifting force of the pneumodynamic wedge.

In practice, bifurcated leaf spring 20 is not used to actually force shoe 16 against the surface of disc 10. Bifurcated leaf spring 20 is used to control the angle of attack and hence the magnitude of the pneumodynamic wedge. If, by adjusting bifurcated leaf spring 20, the force exerted by the pneumodynamic wedge is adjusted to be approximately equal to the combined forces acting to force shoe 16 against the surface of disc 10, shoe 16 will "clamp" into a position that is nearly parallel to the surface of disc 10 and the small pneumodynamic wedge that remains will maintain an air gap between the recording surface of recording head 12 and the surface of disc 10 of approximately 0.00005 inch. In this condition, bifurcated leaf spring 20 is exerting a negligible downward force against shoe 16 and is primarily acting as a "keeper" to prevent the pneumodynamic wedge from increasing in size, thereby preventing the shoe 16 from flying from the surface of disc 10, and also to properly position shoe 16 on the surface of disc 10, as previously described.

If alignment pins 28 are positioned near the lagging edge 32 of shoe 16, a great amount of force must be exerted by bifurcated leaf spring 20 to properly control the magnitude of the pneumodynamic wedge and it is very difficult to prevent shoe 16 from flying from the surface of disc 10. If, on the other hand, alignment pins are positioned close to the leading edge 34 of shoe 16, it has been found that it is impossible to obtain a stable compromise between all the acting forces with the result that the lagging edge 32 may have a tendency to flutter, the pneumodynamic wedge may disappear entirely, and the leading edge 34 may make contact with the recording surface of rotating disc 10.

It has been found that shoe 16 will ride in a stable "clamped" position if alignment pins 28 are positioned approximately 4/6 the length of the shoe from its leading edge 34. While this position is optimum, other positions of alignment pins 28 between 3/6 and 5/6 from leading edge 34 will give satisfactory results. It may be theoretically possible to exceed these limits; however, when these limits are exceeded a balance between the acting forces will be very difficult to obtain without extreme force being exerted by the bifurcated leaf spring 20, or serious instability may occur that will cause lagging edge 32 to flutter.

The recording surface of disc 10 should be of a material sufficiently hard to withstand the moderate amounts of shoe contact that will result when the disc comes to a stop and as it is first started. Under starting and stopping conditions there is insufficient rotational velocity to produce a pneumodynamic wedge and shoe 16 will contact the surface of disc 10.

It is to be understood that the form of the invention herewith shown and described is to be taken as a preferred embodiment, and that various changes in shape and arrangement of parts can be resorted to without departing from the spirit of this invention.

What is claimed is:

1. A recording head mounting for maintaining a very small air gap between a movable magnetic recording member and the recording head irrespective of wobble in said member comprising:

(A) a recording head shoe having at least one surface parallel to the surface of the magnetic recording member, (B) a pair of alignment pins vertically positioned in the top surface and near the side edges of said shoe and placed equidistant from the leading edge of said shoe at points that are between ⅜ and ⅝ of the length of said shoe, and (C) a bifurcated leaf spring coupled to a stationary housing and having holes near the ends of each tine adapted to engage each of said pair of alignment pins whereby said shoe is permitted movement around its longituduinal axis of rotation, around its transverse axis of rotation, and in a vertical direction.

2. A recording head mounting for maintaining a very small air gap between a rotating magnetic recording disc and the recording head irrespective of wobble of said disc comprising:

(A) a substantially rectangular recording head shoe having a flat bottom surface adapted to float on a thin film of air moving with the recording surface of a rotating magnetic recording disc, (B) a recording head core mounted in said shoe with the recording portion of said core flush wiht the flat bottom surface of said shoe, (C) a pair of alignment pins vertically positioned in the top surface of said shoe and placed equidistant from the leading edge of said shoe at points that are between ⅜ and ⅝ the length of said shoe, and (D) a bifurcated leaf spring coupled to a stationary housing and having holes near the end of each tine adapted to engage each of said pair of alignment pins whereby said shoe is permitted movement around its longitudinal axis of rotation, around its transverse axis of rotation, and in a vertical direction.

3. A recording head mounting for maintaining a very small air gap between a rotating magnetic recording disk and the recording head irrespective of wobble of said disk comprising:

(A) a substantially rectangular recording head shoe having a flat bottom surface adapted to float on the laminar flow of air at the surface of a moving magnetic recording member, (B) a recording head mounted in said shoe with the recording portion of said head flush with the flat bottom surface of said shoe, (C) a pair of alignment pins vertically positioned in the top surface of said shoe, each of said pins positioned near a side edge of said shoe, (D) a bifurcated leaf spring coupled to the stationary housing and having holes near the end of each tine adapted to engage each of said pair of alignment pins whereby said shoe is permitted movement about its longitudinal axis of rotation, around its transverse axis of rotation, and in a vertical direction, and (E) an adjustment screw associated with said stationary housing and said bifurcated leaf spring for adjustably controlling the force exerted by said spring against the top surface of said shoe.

References Cited by the Examiner

UNITED STATES PATENTS

| | | | |
|---|---|---|---|
| 2,928,709 | 3/60 | Baumeister. | |
| 2,961,494 | 11/60 | Darou et al. | 179—100.2 |
| 3,018,152 | 1/62 | Cowan. | |

FOREIGN PATENTS

| | | |
|---|---|---|
| 764,434 | 12/56 | Great Britain. |

IRVING L. SRAGOW, *Primary Examiner.*

BERNARD KONICK, *Examiner.*